(12) United States Patent
Sloan

(10) Patent No.: US 8,569,396 B1
(45) Date of Patent: Oct. 29, 2013

(54) ANTIMICROBIAL COATING HAVING BROAD-RANGE ADHESION AND THERMOFORMING CHARACTERISTICS

(76) Inventor: Donald D. Sloan, Platte City, MO (US)

( * ) Notice: Subject to any disclaimer, the term of this patent is extended or adjusted under 35 U.S.C. 154(b) by 0 days.

(21) Appl. No.: 13/360,013

(22) Filed: Jan. 27, 2012

Related U.S. Application Data

(60) Provisional application No. 61/436,899, filed on Jan. 27, 2011.

(51) Int. Cl.
*C09D 5/14* (2006.01)
(52) U.S. Cl.
USPC ............................................. 523/122
(58) Field of Classification Search
USPC ............................................. 523/122
See application file for complete search history.

(56) References Cited

U.S. PATENT DOCUMENTS

| | | | |
|---|---|---|---|
| 5,500,253 A * | 3/1996 | Sanduja et al. | 427/385.5 |
| 7,619,037 B2 | 11/2009 | Higuchi et al. | |
| 2002/0185199 A1 * | 12/2002 | Myers et al. | 148/537 |
| 2006/0248767 A1 | 11/2006 | Hofer et al. | |
| 2008/0118540 A1 | 5/2008 | Roe et al. | |
| 2011/0015300 A1 * | 1/2011 | Whiteford et al. | 524/122 |

* cited by examiner

*Primary Examiner* — Peter Szekely
(74) *Attorney, Agent, or Firm* — Hovey Williams LLP

(57) ABSTRACT

Antimicrobial coatings with anti-staining properties that exhibit broad range adhesion characteristics are provided. The coating compositions comprise a mixture of water-borne resins that can be crosslinked through use of a suitable crosslinking agent. The coating compositions can be used on a variety of substrates and are highly flexible, thereby permitting their use on flexible and stretchable materials. Testing has shown the coatings to exhibit excellent antimicrobial characteristics against a broad class of particularly virulent pathogens.

23 Claims, 1 Drawing Sheet

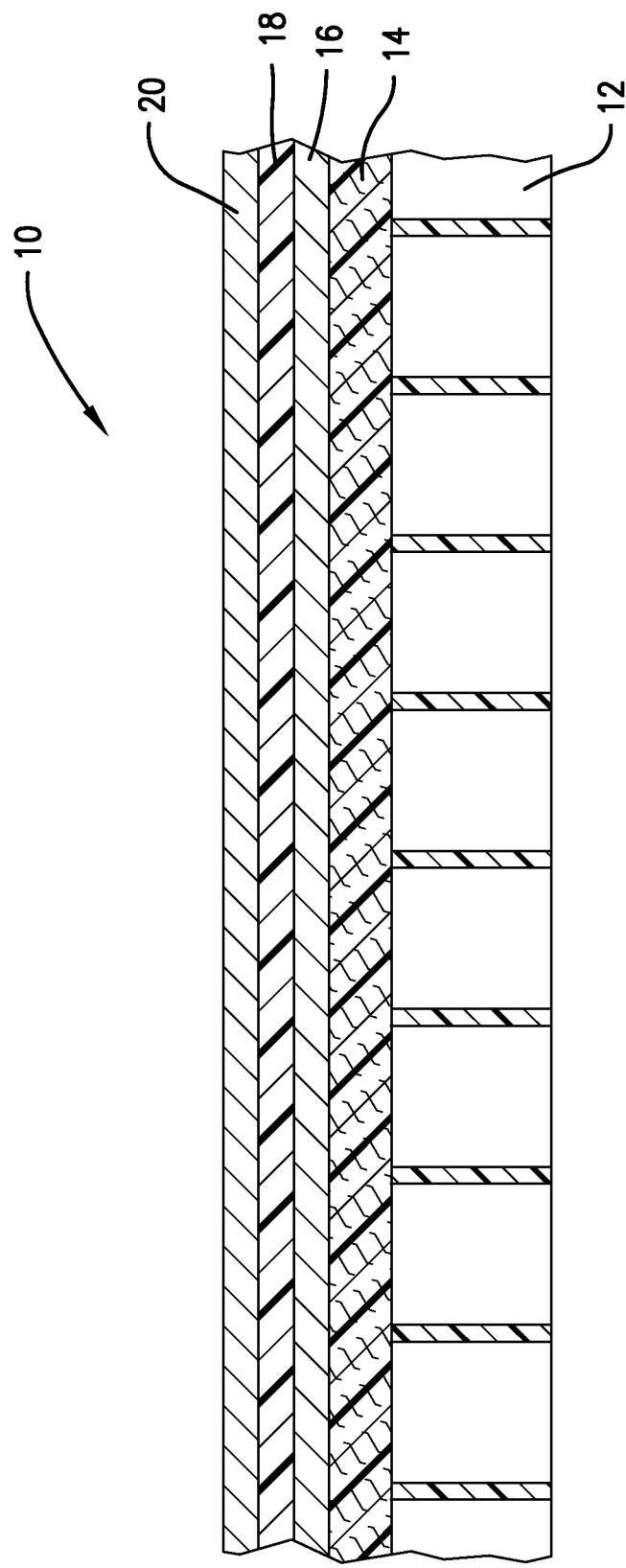

ANTIMICROBIAL COATING HAVING BROAD-RANGE ADHESION AND THERMOFORMING CHARACTERISTICS

BACKGROUND OF THE INVENTION

1. Field of the Invention

The present invention is directed, generally toward antimicrobial coating compositions having excellent adhesion characteristics to a broad range of substrates. In particular, coating compositions described herein are capable of killing a broad range of pathogens, while at the same time providing a flexible barrier capable of elongating and stretching to accommodate fabrication of three-dimensional articles from the substrate to which the coating has been applied.

2. Description of the Prior Art

Protecting surfaces and articles from microbial contamination, particularly surfaces that routinely come into contact with people and food is important in preventing the spread of pathogens that cause serious illness. Pathogen control in places like hospitals, schools, and restaurants is critical to the operation of those establishments. Routine cleaning and disinfecting of articles and surfaces coming into contact with people or food is the primary means of addressing the spread of harmful pathogens. Such methods are highly "active" protection systems requiring significant diligence and labor to be effective. Further, even the most aggressive routine cleaning and disinfecting schedule cannot provide round-the-clock protection, and overly frequent cleaning can interfere with the conduct of normal business operations.

Antimicrobial materials have also been directly incorporated into a number of items during manufacture thereof. Antimicrobial coatings have also been created so that articles can be given antimicrobial characteristics post-manufacture when desired. However, many of these coatings are specific to a particular application, do not offer broad range adhesion to numerous types of surfaces and materials, or are not designed to be a permanent coating. Thus, the utility of these coatings is often fairly limited.

Often, it is also desirable to protect the aesthetic qualities of a surface or article meant for routine contact by people or with food. In order to protect the appearance of such articles, anti-staining or anti-graffiti coatings are used. These coatings prevent soils from permanently bonding with or adhering to the underlying surface, thereby permitting the soils to be washed off of the coated surface.

Heretofore, coatings attempting to combine these antimicrobial and anti-graffiti characteristics are rare, and generally not overly successful at either objective.

SUMMARY OF THE INVENTION

In one embodiment according to the present invention, there is provided an antimicrobial coating composition comprising a water-based dispersion, at least one antimicrobial agent comprising silver or silver ions dispersed within the dispersion, and at least one crosslinking agent. In particular embodiments, the dispersion comprises at least one acrylic polymer resin, at least one melamine polymer resin, and at least one siloxane polymer resin. The crosslinking agent is capable of crosslinking at least one of the acrylic and melamine polymer resins. The antimicrobial agent is effective in inhibiting the growth of and/or capable of reducing levels of a wide variety of bacteria, viruses, and fungi.

In another embodiment according to the present invention, there is provided a sheet of a synthetic resin material comprising an antimicrobial coating, as described herein, applied to at least one side thereof.

In yet another embodiment according to the present invention, there is provided a method of killing or inhibiting the growth of pathogens on the surface of an article. In such method, a coating composition as described herein is applied to at least a portion of the article and then cured thereupon to produce an antimicrobially effective coated portion.

BRIEF DESCRIPTION OF THE DRAWING

FIG. 1 is a schematic illustration of an article, namely an aircraft interior panel, onto which an antimicrobial coating according to the present invention has been applied.

DETAILED DESCRIPTION OF THE PREFERRED EMBODIMENT

According to one embodiment of the present invention, antimicrobially effective coating compositions are provided. The antimicrobial coating composition comprises a water-based dispersion that generally includes one or more water-dispersible polymeric resins. In particular embodiments, the polymeric resins are acrylic-functional resins, and even more particularly styrene/acrylic resins. Certain embodiments of the coating composition may also comprise one or more melamine resins. As explained in further detail below, additional components may be added to the basic dispersion formulation in order to impart other desired characteristics, such as anti-staining or anti-graffiti characteristics. The compositions described herein include one or more antimicrobial agents, particularly a silver-based antimicrobial agent. The particulars of such antimicrobial agents are discussed in greater detail below. In order to enhance the cure speed of the coating composition, one or more crosslinking compounds may be added to the base dispersion.

As indicated above, the coating composition comprises a basic dispersion portion that includes one or more water-dispersible resins. In certain embodiments, the resin comprises one or more acrylic polymers, particularly one or more styrene-acrylic co-polymers. In additional embodiments, the resins are acid functional. These polymer resins can be provided as aqueous dispersions (solutions or emulsions) comprising, in certain embodiments, between about 40% to about 60% by weight water, or in other embodiments between about 45% to about 50% water. Also, in many instances the polymer resins have been approved by a governmental regulatory agency, such as the FDA, for use on food-contacting surfaces. Exemplary resins for use with the present invention include: SETAQUA 6517 a styrene-acrylic resin from Nuplex Resins, Louisville, Ky.; SEQUABOND 9810 a styrene-acrylic resin having a $T_g$ of 30° C. and a pH of 8.5; and SECOAT 7821, a styrene-acrylic resin having a $T_g$ of 15° C. and a pH of 8.5, both of the latter being available form Omnova Solutions, Inc., Chester, S.C. In particular embodiments, the acrylic resins, especially the styrene-acrylic resins have a $T_g$ of less than about 60° C., or between about 0 to about 50° C., or between about 10 to about 40° C.

The melamine resin for use in certain embodiments according to the present invention is a melamine-formaldehyde resin such as Astromel NW3A™, a product of Borden Chemical Company, which comprises about 80 weight percent solids and 20 weight percent water.

The coating composition comprises one or more antimicrobial agents. Generally, any antimicrobial agent may be used with the coating compositions described herein. However, certain embodiments of the present invention utilize silver-based antimicrobial agents. Such silver-based antimicrobial agents may comprise metallic silver (i.e., zero valence atoms) or silver ions. Exemplary silver-based antimicrobial agents include Ionpure™, a soluble glass containing antimicrobial silver ions, available from Ishizuka Glass, Iwakura-shi, Japan, Biomaster™ from Addmaster (UK) Ltd., Agion from Agion Technologies, Wakefield, Mass., and BASF Iraguard B Silver. In certain embodiments, the antimicrobial agent is provided as a solid, particularly a powder, that can be dissolved or suspended in the basic dispersion. As explained further below, depending upon the desired end use for the coating composition, particle size selection for the antimicrobial agent can be important.

In certain embodiments, the crosslinking agent is maintained separate from the rest of the coating formulation prior to use. Just before application of the coating to a desired substrate, the catalyst is added to the coating. In other embodiments, the catalyst may be co-applied to the substrate, such as by way of a dual-head spray gun, so that mixing of the coating and catalyst occurs within the application device itself, or immediately after discharge from the application device. In certain embodiments, the catalyst comprises one or more members selected from the group consisting of polyisocyanates, zinc oxides, and aziridene compounds. Exemplary catalysts include: Bayer's BAYHYDUR XP 2547, a water-dispersible polyisocyanate based on hexamethylene diisocyanate; PERSTORP's EASAQUA XM501 (from, an aliphatic polyisocyanate having low VOC content and being alkylphenol ethoxylates (APEO) free; and Bayer's XAMA 7, a polyfunctional aziridine, having the following formula.

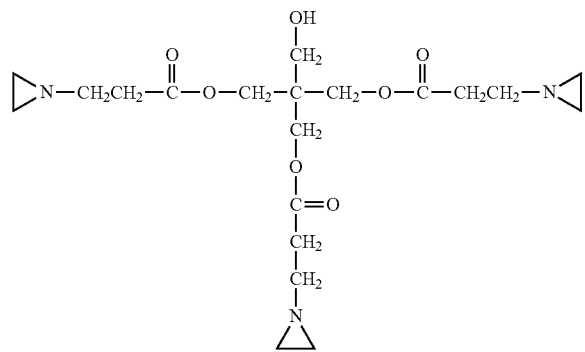

In particular embodiments of the present invention, the crosslinking agent operates to initiate and/or accelerate or promote crosslinking between the various functional groups contain on the acrylic resin and/or the melamine resin.

As noted above, coating compositions according to the present invention may contain additives that impart additional desired characteristics for the coating. One class of such additives includes compounds that contribute anti-staining or anti-graffiti properties. In certain embodiments, these compounds comprise siloxane polymer resins, especially hydroxy-functional polydimethylsiloxane resins. Exemplary siloxane resins of this type include: TEGO PROTECT 5100, a hydroxy-functional polydimethylsiloxane emulsion; and BYK SILCLEAN 3720, polyether-modified, hydroxy-functional polydimethylsiloxane solution. Generally, these siloxane resins self-crosslink at or near the surface of the coating and inhibit materials deposited on the coating from permanently adhering thereto.

The coating compositions may also comprise defoamers, surfactants, coalescing agents, and other components known to those of skill in the art. An exemplary defoamer is TEGO FOAMEX 822, an emulsion of polyether siloxane copolymer. An exemplary surfactant or wetting agent is TROYSOL LAC, a liquid anionic surfactant. Another exemplary surfactant is FLEXIWET PD-15, an anionic diethanolamine salt from ICT, Inc., Cartersville, Ga. An exemplary coalescing agent is dipropylene glycol methyl acetate (DPMA).

As noted above, the coating compositions according to the present invention are water based and generally will comprise significant quantities of water. In certain embodiments, the water content of the coating is at least about 25% by weight, or between about 30% to about 65% by weight. Generally, the majority of water content of the coating is attributable to the use of aqueous dispersions and emulsion of various components such as the resins. Very little, and in some embodiments, no separately added water is used in the coating formulations. As used herein, the term "separately added" means added to or mixed with the other components of the coating as a separate component, and not provided as a part of a solution, dispersion, or emulsion of some other component of the coating. Also, in certain embodiments, the coating compositions comprise very low levels of VOCs (i.e., less than 1% by weight), or are free of VOCs.

Various coalescing agents and/or other rheology modifiers may also be used so as to give the composition a desired viscosity. Exemplary rheology modifying-compositions include dipropylene glycol monomethyl ether (DMPE), dimethylethanolamine (DMAE), and UCAR Polyphobe TR 116 (a high-solids hydrophobically-modified alkali-soluble acrylic emulsion).

Table 1 lists various ranges for various components present in certain embodiments of the coating composition of present invention. As discussed above, many of the resins are provided as a part of an emulsion or dispersion and comprise at least some quantity of water. However, the ranges given below assume a dry basis as the overall water content is listed separately.

TABLE 1

| Component | Broad range (wt. %) | Intermediate range (wt. %) | Narrow range (wt. %) |
| --- | --- | --- | --- |
| Acrylic resin | 5-40% | 10-30% | 15-25% |
| Melamine resin | 20-50% | 25-45% | 30-40% |
| Siloxane resin | 0.5-15% | 1-10% | 2-6% |
| Surfactant | 0-5% | 0.025-3% | 0.5-1% |
| Wetting agent | 0-5% | 0.025-3% | 0.5-1% |
| Coalescing agent | 1-35% | 2-25% | 5-20% |
| Antimicrobial agent | 0.01-5% | 0.05-3% | 0.1-2% |
| Crosslinking agent | 2.5-25% | 5-20% | 10-15% |
| Water | 20-70% | 25-65% | 30-60% |

In certain embodiments, the dispersion comprising the mixture of resins is prepared and kept separate from the antimicrobial crosslinking agent until it is desired to apply the coating to a substrate, as the crosslinking agent will begin crosslinking the various acrylic and melamine resins almost immediately. In alternate embodiments, the antimicrobial agent is also kept separate from the dispersion and mixed therewith along with the crosslinking agent immediately prior to use. Once completely mixed, certain coating compositions will exhibit a pot life of between about 2 to about 6 hours, or between about 3 to about 4 hours.

In certain embodiments according to the present invention, the coating compositions exhibit excellent weatherability and water-resistance characteristics. A xenon-arc weatherometer can be used to test the weatherability characteristics of the coating systems according to ASTM D4459, incorporated by reference herein. Generally, the coatings can undergo at least one year of simulated weathering without any yellowing or discoloration or change in gloss that is discernible to the naked eye. For certain embodiments of the coating composition, when applied and cured upon a polycarbonate or a vinyl substrate, the coated substrate (at least 0.5 mil thick layer) is capable of being immersed in water at ambient temperature for 96 hours without any signs of blistering visible to the naked eye.

In certain embodiments, coating compositions according to the present invention have excellent adhesion characteristics as determined by ASTM D3359-08 Standard Test Methods for Measuring Adhesion by Tape Test. Generally, this test method involves applying a layer of the coating to a particular substrate, creating a lattice pattern of cuts in the cured coating, applying a pressure-sensitive tape over the lattice, and removing the lattice. Performance is then judged by how much, if any, of the coating was removed from the lattice by the tape. In particular embodiments according to the present invention, less than 5% of the coating is removed by the tape, and more preferably, none of the coating is removed by the tape. In this particular test, the coating is deposited on the substrate to form a film of at least 0.5 mil thickness. The substrate used in the adhesion test may vary from rigid plastic substrates like polyethylene, polycarbonate, corrugated polyethylene, flexible vinyl films such as those used for vehicle wraps, and metallic substrates. It is noted that for the purposes of the physical performance tests described herein (e.g., various adhesion and resistance tests), a pigment, dye or other colorant may be added to the coating composition to aid visual inspect of the coating's performance.

In certain embodiments according to the present invention, the coating systems also exhibit excellent impact resistance, particularly as measured by ASTM D2794, incorporated by reference herein. In this test, a panel containing a coating layer (at least 0.5 mil thick) is placed beneath a vertical guide tube down which falls a weight fitted with a handle which protrudes through a vertical slot in the tube. A graduated inch-pound scale is marked along the length of the tube. The weight is raised to a certain level on the graduated tube and dropped onto the panel. The weight can be dropped onto either the coated side or the reverse side of the test panel, although impact on the reverse side general is the more severe test. The coated panel is inspected for cracking. Certain coating systems according to the present invention, when cured on a substrate, do not exhibit cracking visible to the naked eye after a weight is dropped from the 180 inch-pound graduation, even when dropped onto the reverse side of the test panel.

As noted above, coating compositions according to the present invention exhibit excellent adhesion characteristics. These characteristics apply not only for coatings on plastic substrates, but for coatings applied to metallic substrates as well. One test for determining the flexibility of a coating composition applied to a metal is the T-Bend Flexibility Test, such as described in ASTM D4145, incorporated by reference herein. In this test, a coated metal test strip (coating at least 0.5 mil thick) is folded over itself one or more times. In certain embodiments, following this test there are no cracks in the ink that are observable to the naked eye.

Coating systems according to the present invention present a dual functionality: an anti-graffiti or anti-staining functionality and an antimicrobial functionality. In one aspect, the coating composition is a clear coat (i.e., pigment-free) that is capable of being applied over a substrate which may comprise an image or other base coating. The coating composition strongly adheres to many types of surfaces including both natural and synthetic materials. In one embodiment, the coating composition may be applied to synthetic resin materials such as polyolefins including polyethylene and HDPE, fluted polyolefins such as fluted polyethylene available under the name COROPLAST, polycarbonate, acrylonitrile-butadiene-styrene (ABS), PETG, rigid vinyl, pressure sensitive vinyl, vinyl films, acrylics, coated and uncoated paper, top-coated and print-treated polyesters, polystyrene, polyethylene coated card stock, PVC, expanded foam PVC such as Sintra®, Celtec®, and foam board. The coating may also be applied to natural and synthetic textile materials. The coating can also adhere to metallic surfaces. In certain embodiments, the coating composition may be applied to metal items such as utensils, razor blades, surgical implements, and door, faucet, and cabinet handles. However, once cured upon a particular surface, the coating resists permanent staining or discoloration due to foreign materials being deposited thereon.

The coating also exhibits germicidal properties due to the incorporation of an antimicrobial agent therein. The germicidal properties of the coating composition make it particularly suited for use in applications where sanitary conditions are highly desirable such as in restaurants, hospitals, schools, and food and beverage processing facilities. In these applications, the coating composition may be applied to walls, food handling surfaces, and the like. Not only will surfaces having the coating applied thereto resist staining, but the surface itself is capable of killing microbes coming into contact therewith. The coating compositions are particularly suited for protecting surfaces from contamination with one or more, and in some embodiments all, of the following pathogens: *K. pneumoniae*, Methicillin Resistant *S. aureus* (MRSA), *Clostridium difficile*, *S. epidermidis*, *A. baumannii*, *C. albicans*, *E. coli*, *P. aeruginosa*, *S. aureus*, *Enterococcus* spp. (e.g. Vancomycin Resistant *Enterococcus faecalis* (VRE)), *Candida* spp., and CoNS. In particular embodiments, the coating compositions inhibit the growth of one or more, and preferably all, of the foregoing pathogens when tested according to AATCC Test Method 147. In still other embodiments, the coating composition is able to provide greater than a 3-log reduction in the levels of at least one, and preferably all, of the foregoing pathogens when tested according to Japanese Industrial Standard (JIS) Z 2801. In yet other embodiments, the coating composition is able to provide greater than a 4-log reduction, or even greater than a 5-log reduction, in one or more of the foregoing pathogens.

In certain embodiments, the particle size of the antimicrobial agent in the cured coating is such that at least a portion of the antimicrobial agent protrudes through the surface of the coating. It is believed that this characteristic provides increased surface area for contacting of the antimicrobial agent with the microorganisms present on the surface of the coating. Further, unlike other antimicrobial coatings or surfaces, because at least a portion of the antimicrobial agent protrudes from the surface of the coating, there is no need for the antimicrobial agent to gradually migrate out of the coating into a position where it is available for contact with the microorganisms. Thus, a very high level of antimicrobial efficacy is observed with the coating compositions from the point of their initial application.

In certain embodiments of the present invention, the coating is applied to a particular substrate at a thickness of about 0.1 to about 5.0 mils, or between about 0.2 to about 3.0 mils, or between about 0.3 to about 1 mil, or between about 0.4 to about 0.6 mil. Generally, the larger the coating thickness used, the larger particle size of the antimicrobial agent used.

In certain embodiments, the antimicrobial agent exhibits an average particle size (i.e., the average of the particle's dimensions) that is greater than the thickness of the surrounding coating. In particular embodiments, the antimicrobial agent exhibits an average particle size that is at least 5% greater, or at least 10% greater, or at least 25% greater than the thickness of the surrounding coating. When viewed under a microscope, this feature causes the coating surface to acquire a "rocky" or uneven texture. Again, this irregular surface topography causes an increase in the total surface area of the antimicrobial agent that is exposed and available for contact with microbes to be controlled or killed.

As noted above, the coating composition exhibits resistance to staining. The composition resists staining due to fingernail polish, shoe polish, magic markers, lipstick, mustard, ketchup, and various food sauces. By the term "resists staining," it is meant that surfaces upon which coating formulations according to the present invention are applied and subsequently contacted by one of the foregoing substances may be cleaned without leaving traces of the staining substance remaining on the surface that are visible to the naked eye.

In certain embodiments of the present invention, the coating compositions also exhibit excellent resistance to a variety of aggressive solvents and chemicals such as acetone, paint thinners and acids. Specifically, the coating composition can be tested in accordance with ASTM D5402, incorporated by reference herein, and withstand at least 10 rubs with a cloth or wad of cotton soaked with acetone without showing visible signs of the coating being removed from the substrate.

In particular embodiments, the coating composition may be applied to flexible sheets or films such as those used as wall coverings (e.g., wall paper). The coating composition also may be applied to labeling and packaging materials, particularly in food, medical, and pharmaceutical applications. In other embodiments, the coating composition may be applied to paper products that can be used to create books, book covers, and laminates.

In particular embodiments, the coating composition may be applied on the interior surfaces of aircraft. Interior surfaces may include, but are not limited to, interior air ducts surfaces of aircraft, interior cabins of aircraft, and aircraft cargo holds, as well as other interior surfaces of aircraft. Cabin panels are widely produced in a sandwich construction, comprising a honeycomb core and cover layers that are arranged on both sides of it. Exemplifying this construction, FIG. 1 schematically depicts a cross-section of an aircraft interior panel 10. In this construct, a support layer 12, such as a sheet of synthetic resin material, optionally having a honeycomb core, is provided as a basic support upon which the other layers of panel 10 are applied. A textile layer 14, such as a prepreg epoxy coated nylon fiber layer, is then applied to support layer 12. An embossed layer 16 may be provided on top of textile layer 14 in order to provide a desired aesthetic appearance. Next, a Tedlar® polyvinyl fluoride film 18 is laid down over embossed layer 16, and an antimicrobial layer 20 as described herein is applied as the top coat. In certain embodiments, the layers of panel 10 are laid down and then the entire panel is baked to ensure bonding between the various layers. The panel can then be formed, if it has not previously been shaped, to meet the particular end use requirements for the panel.

In certain embodiments, the coating composition exhibits high elongation properties enabling the coating to elongate or stretch along with the substrate to which the coating is applied. In certain embodiments, the coating can undergo elongation of at least 100%, or between about 100% to about 900%, or between about 300% to about 900%, or even between about 400% to about 900%, without showing visible signs of cracking, separating or other types of faults. This property permits the coating to be used in applications where the substrate to which the coating is applied is subsequently molded, such as through thermoforming operations, extrusion molding, or injection molding. An exemplary application of this embodiment of the invention is in the manufacture of plastic cups, utensils, containers, and other food handling and packaging devices.

In other embodiments the coating compositions present elongation properties on par with the elongation properties described for certain ink compositions disclosed in U.S. Pat. Nos. 7,427,317, 7,431,759, and 7,662,224, all of which are incorporated by reference herein in their entireties.

In other embodiments, the coating composition may be applied to glass bottles or other glass containers.

The coating composition may be applied to a desired substrate through any number of knowing methods such as by spraying, roll coating, flexographic printing, lithographic printing, and gravure printing for example. The coating compositions can also be made suitable for digital printing. In these applications, the coating composition should be properly filtered so that the solids dispersed in the coating have an appropriate particle size that will not clog the inkjet nozzles. Once applied to the substrate, the coating can be air dried, jet dried, or baked onto the substrate at a temperature of up to 600° F. The dispersion portion of the coating composition also exhibits excellent storage stability, remaining stable for at least one year when stored at 25° C.

In certain embodiments, particular those in which the substrate to which the coating composition is applied are intended for subsequent forming processing, uniformity of application of the coating across the entire region of the substrate desired to be coated is important. If the coating composition is not uniformly applied, bending, stretching, or other forming operations of the substrate will result in the formation of gaps or regions in which the coating does not completely cover the desired substrate area. As the coating composition, in certain embodiments, is a clear coating, these gaps in coverage may not be readily detectable. Compositions according to the present invention help to avoid these difficulties by presenting sufficiently high solids contents. In certain embodiments, the solids content of the coating composition is between about 30% to about 60% by weight, or between about 40% to about 50% by weight. For coating compositions having lower solids contents, upon evaporation of the liquid portion of the coating composition, the cured coating may be left too thin in certain areas so that when those areas are formed, gaps in coating coverage present themselves. Solids contents of the aforementioned magnitude permit formation of uniformly thick coatings that are less susceptible to this undesired thinning that leads to decreased antimicrobial protection for the substrate area intended to be protected. The ability of the coating compositions to provide uniformly thick cured coatings on the substrate, coupled with its excellent adhesion and high-elongation properties permit the coating composition to provide continuous antimicrobial and anti-graffiti effects over the entire portion of the substrate for which protection is sought. Thus, the present invention greatly reduces the risk of creating discrete zones or gaps on the substrate in which the coating is not present, which would otherwise leave portions of the substrate unprotected.

The following are exemplary antimicrobial coatings made in accordance with the present invention. It is to be understood, however, that these examples are provided by way of illustration and nothing therein should be taken as a limitation upon the overall scope of the invention.

| Component | Amount (% by weight) |
|---|---|
| PART A | |
| SETAQUA 6517 (styrene/acrylic resin) | 42.5% |
| ASTROMEL NW3A (melamine resin) | 41.8% |
| TEGO PROTECT 5100 (hydroxy-functional polydimethylsiloxane emulsion) | 3.75% |
| BYK SILCLEAN 3720 (polyether-modified, hydroxy-functional polydimethylsiloxane solution) | 2.9% |
| FOAMEX 822 (polyether siloxane defoamer) | 0.1% |
| TROYSOL LAC (wetting agent) | 0.2% |
| DPMA (dipropylene glycol methyl acetate coalescing agent) | 8.25% |
| PART B | |
| IONPURE (antimicrobial agent) | 0.5% |
| PART C | |
| PERSTORP XM-501 (isocyanate crosslinking agent) | 10-15% |

| Component | Amount (% by weight) |
|---|---|
| PART A | |
| SETAQUA 6517 (styrene/acrylic resin) | 32.55% |
| SEQUABOND 9810 (styrene/acrylic resin) | 32.55% |
| ASTROMEL NW3A (melamine resin) | 18% |
| TEGO PROTECT 5100 (hydroxy-functional polydimethylsiloxane emulsion) | 4.54% |
| BYK SILCLEAN 3720 (polyether-modified, hydroxy-functional polydimethylsiloxane solution) | 2.27% |
| FS-8050 (fluorinated wetting agent) | 1.13% |
| DPMA (dipropylene glycol methyl acetate coalescing agent) | 7.95% |
| PART B | |
| IONPURE (antimicrobial agent) | 0.5% |
| PART C | |
| PERSTORP XM-501 (isocyanate crosslinking agent) | 12% |

Note that in Examples 1 and 2, Parts A and B total 100%. Part C is added to the combined Parts A and B at the stated level. Thus, the percentages given for Parts A and B are based upon the combined weight of Parts A and B only, whereas the percentage given for Part C is based upon the total combined weight of the composition.

| Component | Amount (% by weight) |
|---|---|
| PART A | |
| Part A from Example 1 | 43.28% |
| SEQUABOND 9810 (styrene/acrylic resin) | 43.28% |
| PART B | |
| IONPURE (antimicrobial agent) | 0.50% |
| PART C | |
| PERSTORP XM-501 (isocyanate crosslinking agent) | 12.94% |

Example 4

| | Amount (% by weight) |
|---|---|
| PART A | |
| SETAQUA 6517 (styrene/acrylic resin) | 32.45% |
| SECOAT 7821 (styrene/acrylic resin) | 32.45% |
| ASTROMEL NW3A (melamine resin) | 18% |
| TEGO PROTECT 5100 (hydroxy-functional polydimethylsiloxane emulsion) | 3% |
| BYK SILCLEAN 3720 (polyether-modified, hydroxy-functional polydimethylsiloxane solution) | 2% |
| FLEXIWET PD-15 (diethanolamine salt) | 0.6% |
| IONPURE (antimicrobial agent) | 0.5% |
| DEIONIZED WATER | 3% |
| DPMA (dipropylene glycol methyl acetate coalescing agent) | 6% |
| PART B | |
| XAMA 7 (polyfunctional aziridine crosslinking agent) | 2% |

In order to assess the antimicrobial characteristics of formulations prepared in accordance with the present invention, the coating formulation from Example 1 above was tested for its ability to inhibit and kill various microbes. It is noted that in some trials, the isocyanate crosslinking agent (Part C) was not used. However, testing indicated that the lack or presence of the crosslinking agent did not affect the antimicrobial properties of the coating composition. The coating was applied to a sample of vinyl wallcovering at an average film thickness of 0.47-0.50 mil. The coating was dried using forced air at a temperature of 70° C. for 30 minutes, followed by air drying at room temperature for 24 hours.

Coated wallcovering samples were tested for growth inhibition of *S. aureus*, *K. pneumoniae*, Methicillin Resistant *S. aureus* (MRSA), Vancomycin Resistant *Enterococcus faecalis* (VRE), *S. epidermidis*, *C. difficile*, *A. baumannii*, *C. albicans*, *E. coli*, and *P. aeruginosa* according to AATCC Test Method 147, which is incorporated herein by reference. AATCC Test Method 147 is a qualitative test used to detect bacteriostatic activity. In this test, specimens of the test material are placed in intimate contact with growth agar which has been previously streaked with the test organism. After incubation, a clear area of interrupted growth underneath and along the sides of the test material indicates antibacterial activity of the specimen. After 24 hours, zones of inhibition were observed for all microorganisms, except for *E. coli*. However, some growth inhibition below the sample was observed for *E. coli*. Therefore, at least some growth inhibition was observed for all of the microorganisms tested.

Coated wallcovering samples were also tested for the ability to reduce the levels of or kill *K. pneumoniae*, Methicillin Resistant *S. aureus* (MRSA), Vancomycin Resistant *Enterococcus faecalis* (VRE), *S. epidermidis*, *A. baumannii*, *C. albicans*, *E. coli*, and *P. aeruginosa* according to Japanese Industrial Standard (JIS) Z 2801, which is incorporated herein by reference. The results of the testing are noted in the Table 2 below.

TABLE 2

| Microorganism | Sample | Contact Time | CFU/Coupon | R Value | % Reduction vs. Control |
|---|---|---|---|---|---|
| E. coli | Sample | Time Zero | 2.25E+05 | >5.49 | >99.9997% |
|  |  | 24 Hours | <5 |  |  |
|  | Control | Time Zero | 1.80E+05 | N/A | N/A |
|  |  | 24 Hours | 1.55E+06 |  |  |
| P. aeruginosa | Sample | Time Zero | 2.65E+05 | >6.60 | 99.99998% |
|  |  | 24 Hours | <5 |  |  |
|  | Control | Time Zero | 2.80E+05 | N/A | N/A |
|  |  | 24 Hours | 2.00E+07 |  |  |
| A. baumannii | Sample | Time Zero | 1.16E+05 | 5.98 | 99.99989% |
|  |  | 24 Hours | 5.00E+00 |  |  |
|  | Control | Time Zero | 1.18E+05 | N/A | N/A |
|  |  | 24 Hours | 4.75E+06 |  |  |
| K. pneumoniae | Sample | Time Zero | 2.09E+05 | 3.48 | 99.967% |
|  |  | 24 Hours | 3.30E+02 |  |  |
|  | Control | Time Zero | 2.52E+05 | N/A | N/A |
|  |  | 24 Hours | 1.00E+06 |  |  |
| C. Albicans | Sample | Time Zero | 2.59E+05 | 4.18 | 99.993% |
|  |  | 24 Hours | 4.00E+01 |  |  |
|  | Control | Time Zero | 3.24E+05 | N/A | N/A |
|  |  | 24 Hours | 6.00E+05 |  |  |
| S. epidermidis | Sample | Time Zero | 4.45E+04 | 2.9 | 99.875% |
|  |  | 24 Hours | 5.00E+00 |  |  |
|  | Control | Time Zero | 5.20E+04 | N/A | N/A |
|  |  | 24 Hours | 4.00E+03 |  |  |
| Methicillin Resistant S. aureus (MRSA) | Sample | Time Zero | 1.04E+05 | 4.52 | 99.997% |
|  |  | 24 Hours | 3.50E+01 |  |  |
|  | Control | Time Zero | 9.15E+04 | N/A | N/A |
|  |  | 24 Hours | 1.15E+06 |  |  |
| Vancomycin Resistant Enterococcus faecalis (VRE) | Sample | Time Zero | 3.06E+05 | 3.92 | 99.988% |
|  |  | 24 Hours | 3.00E+01 |  |  |
|  | Control | Time Zero | 2.44E+05 | N/A | N/A |
|  |  | 24 Hours | 2.50E+05 |  |  |

Method of Calculation of Antimicrobial Activity:
R (Average Log Reduction) = Log (B/C), where:
B = Average number of viable cells on the control pieces after 24 hours.
C = Average number of viable cells on the test pieces after 24 hours.

I claim:

1. An antimicrobial coating composition comprising:
a water-based dispersion comprising—
about 5 to about 40 weight percent of at least one acrylic polymer resin on a dry basis;
about 20 to about 50 weight percent of at least one melamine polymer resin on a dry basis;
about 0.5 to about 15 weight percent of at least one siloxane polymer resin on a dry basis;
at least one antimicrobial agent comprising silver or silver ions dispersed within said dispersion; and
at least one crosslinking agent capable of crosslinking at least one of said acrylic and melamine polymer resins.

2. The antimicrobial coating composition according to claim 1, wherein said at least one acrylic polymer resin comprises a styrene/acrylic polymer resin.

3. The antimicrobial coating composition according to claim 1, wherein said at least one siloxane polymer resin comprises a polydimethyl siloxane.

4. The antimicrobial coating composition according to claim 1, wherein said at least one cross-linking agent is selected from the group consisting of isocyanates, polyfunctional aziridines, zinc oxides, and combinations thereof.

5. The antimicrobial coating composition according to claim 1, wherein said at least one antimicrobial agent comprises a soluble glass containing silver ions.

6. The antimicrobial coating composition according to claim 5, wherein said at least one antimicrobial agent is water soluble.

7. The antimicrobial coating composition according to claim 1, wherein said coating composition when cured on a substrate is capable of elongating between about 100% to 900% during thermal processing of the substrate which results in stretching of the substrate.

8. The antimicrobial coating composition according to claim 1, wherein said coating composition further comprises a coalescing agent.

9. The antimicrobial coating composition according to claim 8, wherein said coalescing agent is dipropylene glycol methyl acetate.

10. The antimicrobial coating composition according to claim 1, wherein said coating composition further comprises one or more members selected from the group consisting of surfactants and defoaming agents.

11. The antimicrobial coating composition according to claim 1, wherein said coating composition, when applied to and cured upon a substrate is capable of at least 3-log reduction of K. pneumoniae, Methicillin Resistant S. aureus (MRSA), Clostridium difficile, S. epidermidis, A. baumannii, C. albicans, E. coli, P. aeruginosa, S. aureus, Enterococcus spp. (e.g., Vancomycin Resistant Enterococcus faecalis (VRE)), Candida spp., and CoNS according to Japanese Industrial Standard (JIS) Z 2801.

12. A sheet of a synthetic resin material comprising an antimicrobial coating applied to at least one side thereof, said antimicrobial coating comprising the cured coating composition according to claim 1.

13. The sheet according to claim 12, wherein the thickness of said coating on said sheet is between about 0.1 to about 5.0 mils.

14. The sheet according to claim 12, wherein said sheet comprises one or more member selected from the group consisting of polyethylene, polypropylene, polycarbonate, acrylonitrile-butadiene-styrene (ABS), PETG, PET, polyesters, polystyrene, and PVC.

15. The sheet according to claim 12, wherein at least some of the antimicrobial agent is present as particles having surfaces that protrude from the surface of the cured coating.

16. A method of killing or inhibiting the growth of pathogens on the surface of an article comprising:
applying to at least a portion of said article a quantity of the coating composition of claim 1; and
curing said coating composition on said article to produce an antimicrobially effective coated portion.

17. The method according to claim 16, said method further comprising the step of thermally forming said article after curing of said coating composition thereon.

18. The method according to claim 17, wherein said thermal forming step results in the elongation of at least a portion of the article by between about 100% to about 900%.

19. The method according to claim 16, said method comprising the step of creating an image on said article prior to application of said coating composition, wherein said coating composition is applied as a clear coat over said image.

20. The method according to claim 16, wherein said coating composition is applied to said article by an application method selected from the group consisting of spraying, rollcoating, flexographic printing, lithographic printing, and gravure printing.

21. The method according to claim 16, wherein said article comprises a member selected from the group consisting of polyolefins, polycarbonate, acrylonitrile-butadiene-styrene (ABS), PETG, rigid vinyl, pressure sensitive vinyl, vinyl films, acrylics, coated and uncoated paper, top-coated and print-treated polyesters, polystyrene, polyethylene coated card stock, PVC, expanded foam PVC, and foam board.

22. The antimicrobial coating composition according to claim 1, wherein said coating composition comprises about 10 to about 30 weight percent of said acrylic polymer resin on a dry basis, about 25 to about 45 weight percent of said melamine polymer resin on a dry basis, and about 1 to about 10 weight percent of said siloxane polymer resin on a dry basis.

23. The antimicrobial coating composition according to claim 1, wherein said coating composition comprises about 15 to about 25 weight percent of said acrylic polymer resin on a dry basis, about 30 to about 40 weight percent of said melamine polymer resin on a dry basis, and about 2 to about 6 weight percent of said siloxane polymer resin on a dry basis.

* * * * *